Sept. 19, 1967    J. P. FRYSZTAK    3,343,070
ELECTRONIC SYSTEM
Filed Feb. 24, 1964
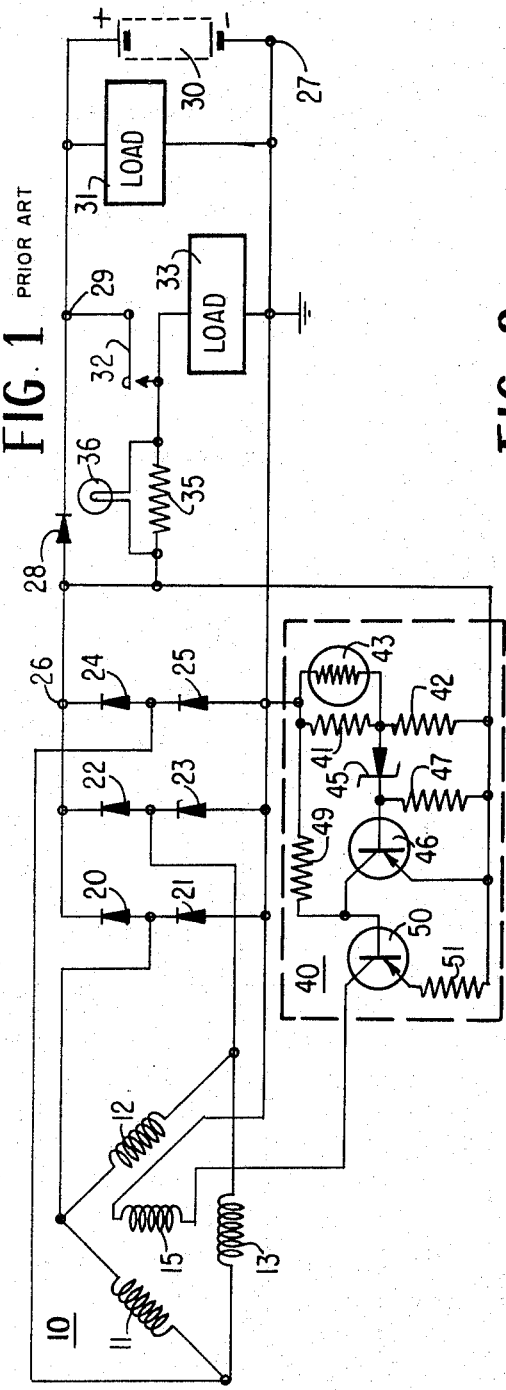
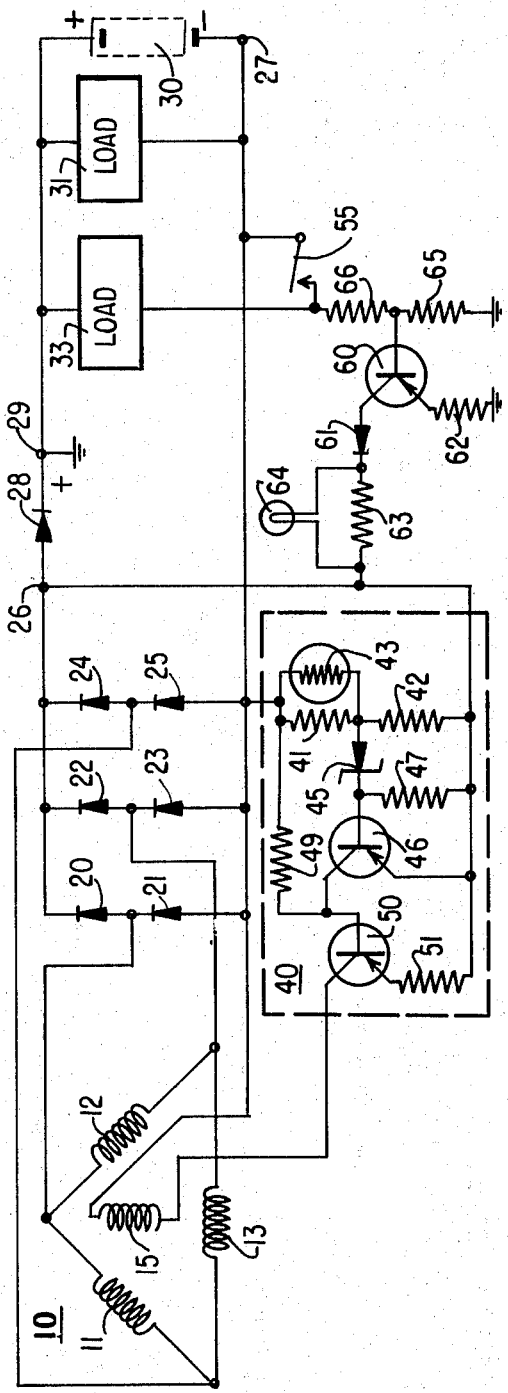
INVENTOR.
Jerome P. Frysztak
BY Mueller and Aichele
Attys.

United States Patent Office 3,343,070
Patented Sept. 19, 1967

3,343,070
ELECTRONIC SYSTEM
Jerome P. Frysztak, Glendale Heights, Glen Ellyn, Ill., assignor to Motorola, Inc., Franklin Park, Ill., a corporation of Illinois
Filed Feb. 24, 1964, Ser. No. 346,770
6 Claims. (Cl. 322—79)

This invention relates generally to electrical systems for vehicles, and more particularly to an electrical system including an alternator, rectifiers and a transistor regulator, and a circuit for applying initial field excitation current to the alternator.

Alternator-rectifier systems are in common use to provide direct current for automotive vehicles, such as automobiles and trucks. These systems may include a transistor regulator for controlling the alternator field current so that the alternator output provides the desired voltage for charging the battery and energizing the electrical equipment on the vehicle. In order to provide effective regulation, the alternator field must have low magnetic retentivity so that the alternator output can be held down when the engine is operating at high speed. This makes it necessary to provide field current to start the alternator.

In order to prevent discharge of the vehicle battery through the regulator when the vehicle is not in use, it is necessary that the battery be isolated from the regulator and this is accomplished by the use of a diode having low reverse leakage. In patent application Ser. No. 119,947, filed June 27, 1961 by Franklin C. Brewster, now Patent No. 3,138,751, a system is described for providing initial field excitation current through the ignition switch so that the alternator operates to provide an output. This circuit bypasses the isolating diode to provide the initial field excitation current, and when the alternator output reaches a value to cause conduction of the diode, this shorts across the circuit through the ignition switch. This system has been used successfully in units which have been supplied in large volume.

Since the diode is preferably provided as part of the alternator structure, it is desirable to use the same alternator and diode unit in vehicles having positive ground which is used in vehicles having negative ground. However, in units constructed for use in vehicles having electrical systems with the negative polarity grounded the diode which isolates the regulator from the battery must be connected to ground when the unit is used in vehicles having electrical systems with the positive polarity grounded. In such vehicles, the ignition switch is connected to the negative terminal of the electrical system and cannot be used to complete a circuit for providing initial field excitation current.

It is an object of the present invention to provide an improved circuit for supplying initial field excitation current for the alternator of a vehicular electrical system including an alternator-rectifier unit.

Another object of the invention is to provide a circuit for supplying initial field excitation current for the field of an alternator so that the same alternator, rectifiers and voltage regulator can be used in vehicles having either the negative or positive polarity of the electrical system grounded.

A further object is to provide an auxiliary circuit for use with an alternator-rectifier unit designed for use in vehicles having the negative polarity grounded, to adapt the same to vehicles having the positive polarity grounded, and which provides initial field excitation current for the alternator field.

A feature of the invention is the provision of an alternator-rectifier unit having positive and negative terminals insulated from ground and a field winding connected to the negative terminal, a diode connected between the positive terminal and an output terminal, and a transistor regulator for controlling the application of field current from the positive terminal to the field winding, with a transistor switch circuit bypassing the diode to provide initial field excitation current for the alternator.

Another feature of the invention is the provision of a system as described in the preceding paragraph, wherein the transistor switch circuit includes a diode to prevent current flow from the positive terminal of the alternator unit to the output terminal through the switch circuit, and which may include an indicator light to indicate when the battery is discharging through the regulator.

The invention is illustrated in the drawings in which:
FIG. 1 illustrates a system including an alternator, rectifiers and a transistor voltage regulator in a negative ground electrical system; and
FIG. 2 illustrates the circuit of the invention used with the equipment of FIG. 1 in an electrical system having the positive terminal grounded.

In practicing the invention an alternator-rectifier unit is provided having positive and negative terminals for providing a direct current output, and with an isolating diode connecting the positive terminal to an output terminal. A transistor voltage regulator controls the supply of current from the positive terminal to the field winding of the alternator, which is connected to the negative terminal. The regulator senses the voltage between the positive and negative terminals of the alternator to control the current applied to the field, and the isolating diode prevents discharge of the battery through the regulator. The battery of the vehicle and other load or current consuming devices are connected between the output terminal and the negative terminal. The equipment as described may be used in an electrical system having either the positive or the negative terminal thereof grounded. When the negative terminal of the battery is grounded, the positive terminal is connected to the ignition switch and a circuit may be provided from the ignition switch through a resistor to the positive terminal of the alternator unit which is connected to the regulator. This provides a path for initial field excitation current to flow through the regulator to the field, which path bypasses the isolation diode which is non-conducting until the alternator output exceeds the battery voltage. When using the alternator unit in a vehicle having an electrical system with the positive terminal grounded, the ignition switch will be connected to the negative terminal of the battery. In such case it is not possible to provide current from the battery through the ignition switch to the regulator and the alternator field for starting. To provide initial field excitation current, a transistor switch circuit is used for completing a path from the positive terminal of the alternator to ground, and the transistor is selectively rendered conductive by a bias circuit extending from the ignition switch, and which provides a negative bias voltage to the transistor. The switch circuit may include a diode for preventing reverse current through the transistor switch circuit, and an indicator light to indicate when the battery is applying current to the alternator field.

Referring now to the drawing, in FIG. 1 there is illustrated an alternator-rectifier-regulator system used in a vehicle having a battery and an electrical system with the negative polarity potential grounded. This is the system as described in application Serial No. 119,947 referred to above, and is designated on FIG. 1 as "Prior Art." The alternator 10 includes three-phase output windings 11, 12 and 13, and field winding 15. The field winding 15 may be supported on a rotor and energized through slip rings in a known manner. In FIG. 1 the output windings are shown connected in delta, but it is pointed out that these windings can be connected in Y if desired. Rectifier pairs 20 and 21, 22 and 23, and 24 and 25, rectify the three-phase AC output from the alternator to provide direct current between positive terminal 26 and negative terminal 27.

Diode 28 is connected to positive terminal 26 with the proper polarity to provide current flow fom this terminal to the output terminal 29. In a vehicle having a negative grounded electrical system, the positive terminal is insulated from ground and connected to the battery 30 and to other electrical loads of the vehicle represented by load 31. The positive terminal is also connected through ignition switch 32 to load 33 which may include the ignition system for the internal combustion engine. A connection is made from ignition switch 32 to the positive terminal 26 through resistor 35 and/or indicator light 36, as explained in the foregoing application.

The transistor regulator 40 senses the voltage between the positive terminal 26 and the negative terminal 27 of the alternator-rectifier unit, and responds to the voltage derived from voltage divider formed by resistors 41 and 42 and thermistor 43. This divider provides a voltage input for the regulator which is compensated for temperature by the thermistor 43. The voltage from the input is applied to one electrode of Zener diode 45, the other electrode of which is connected to the base electrode of transistor 46. The base electrode of transistor 46 is connected to the positive terminal through resistor 47. The transistor 46 is selectively rendered conducting when the input voltage exceeds the breakdown voltage of the Zener diode 45 in a manner well understood in the art. The collector electrode of transistor 46 is connected to the base electrode of transistor 50, and the common point is connected through resistor 49 to the negative terminal. The emitter electrode of transistor 50 is connected to the positive terminal through resistor 51, and the collector electrode is connected through the field winding 15. Transistor 50 is normally conducting when potential is applied to the regulator circuit to supply current to the field 15. When transistor 46 is rendered conducting, it acts to cut off transistor 50 to interrupt the flow of current to the field winding 15. Transistor 50 switches on and off to energize the field winding 15 intermittently to provide the desired output voltage.

When the alternator is not operating, no potential appears at terminal 26 to provide initial field excitation current to the field winding. Diode 28 is of a polarity to prevent current flow from the battery to terminal 26, and therefore the battery cannot provide the field current through this connection. However, when ignition switch 32 is closed, current from the battery flows through the ignition switch and resistor 35 (and/or indicator light 36) to the regulator, and through resistor 51 and the emitter-collector path of transistor 50 to the field winding 15. This provides initial field excitation current for the alternator as the ignition switch is closed so that when the automotive engine operates, the alternator will produce an output between terminals 26 and 27. Because of the resistance 35 connected in series with the ignition switch 32, the field current provided by the current therethrough will be limited. However, as the alternator produces an output, voltage will build up at terminal 26 to provide full field current. This will render the diode 28 conducting to short out this circuit so there will be substantially no current flow therethrough. Diode 28 will conduct when the positive voltage from the alternator rectifier unit at point 26 exceeds the voltage at point 29, which is the battery voltage.

FIG. 2 illustrates the system of the invention which includes the same alternator and rectifier unit as in FIG. 1, which provides voltage between positive terminal 26 and negative terminal 27. However, in the circuit of FIG. 2 the positive terminal of the battery and of the electrical system is grounded rather than the negative terminal as in FIG. 1. Diode 28 connects the positive terminal 26 to the output terminal 29, which is grounded. The battery 30 and load 31 are connected between the output terminal 29 and the negative terminal 27. The ignition switch 55 is connected to the ungrounded side of the system, which is the negative terminal rather than the positive terminal.

Inasmuch as the field winding 15 of the alternator is permanently connected to the negative terminal 27, it is not possible to supply initial field excitation current through the ignition switch 55 which is also connected to the negative terminal. It is, therefore, necessary to provide a different bypass about the isolation diode 28 which is connected from positive terminal 26 to the grounded output terminal 29.

In the circuit of FIG. 2, a circuit is completed to the voltage regulator through the transistor switching circuit including transistor 60, diode 61 and resistors 62 and 63. When the transistor 60 conducts, the circuit including resistor 62, the emitter-collector path of transistor 60, diode 61 and resistor 63 bypasses isolation diode 28 to provide a connection from the positive terminal 26 to the grounded output terminal 29. This output terminal is also connected to the positive terminal of the battery. Accordingly, battery current flows through this circuit and through the field winding 15 to the negative terminal which in this system is isolated from ground. The transistor 60 is rendered conducting by the bias circuit including resistors 65 and 66 connected to ignition switch 55. When switch 55 is closed, negative potential is applied to the base electrode of the transistor 60 to render the transistor conducting, so that the emitter-collector circuit thereof completes the path previously described for supplying initial field excitation current through the regulator 40 to the field winding 15.

An indicator light 64 may be connected in parallel with resistor 63, or may provide all the resistance required in the circuit in some applications. Such a light will be illuminated when current flows through the switching circuit to indicate that the battery is discharging through the voltage regulator.

By providing the auxiliary circuit shown in FIG. 2, it is possible to use the same alternator, rectifiers and regulator in vehicles in which the positive terminal is grounded as in vehicles in which the negative terminal is grounded. The additional circuit is not required in vehicles having the negative terminal grounded, as is shown in FIG. 1. The isolating diode 28 is connected in exactly the same way in FIG. 2 as in FIG. 1, so that the isolating diode and the three-phase rectifying diodes can all be provided in a unitary structure which is suitable for both applications. This is extremely important in large units such as may be used in trucks, as it is desirable to have units available for vehicles wherein either the positive or the negative terminal of the electrical system is grounded. Without the circuit of the invention it would be necessary to stock separate units for positive and negative grounded vehicles, and to do this at a large number of different supply stations requires substantial duplication of equipment. By using the same units which are used in relatively large quantity in vehicles having the negative terminal of the electrical system grounded, and since the auxiliary switching circuit is of simple low cost construction, the cost of the equipment required for positive grounded vehicles is still quite low.

What is claimed is:

1. A circuit for providing field current to an alternator-regulator system including an alternator-rectifier unit having positive and negative terminals with a diode connected between the positive terminal and an output terminal, and the alternator having a field winding connected between the negative terminal and an input terminal, and wherein a regulator controls the flow of field current from the positive terminal to the input terminal in accordance with the voltage between the positive and negative terminals, said circuit including a transistor switch circuit portion for connecting the output terminal of the alternator-rectifier unit to the positive terminal thereof to thereby bridge the diode, said switch circuit portion including a transistor having electrodes for selectively completing the circuit from the positive terminal of the alternator to the output terminal, and a biasing circuit portion coupled to said transistor and including a switch connected to the negative terminal of the alternator-rectifier unit to bias said transistor to render the same conducting.

2. A circuit for providing field current to an alternator-regulator system connected to a battery and including an alternator-rectifier unit having a positive terminal and a negative terminal connected to the battery, with a field winding connected between the negative terminal and an input terminal and a rectifier connected between the positive terminal and an output terminal connected to the battery, and wherein a regulator controls the flow of field current from the positive terminal to the input terminal in accordance with the voltage between the positive and negative terminals, said circuit including a transistor switch circuit portion for connecting the output terminal of the alternator-rectifier unit to the positive terminal thereof to thereby bridge the rectifier, said switch circuit portion including a transistor having output electrodes for selectively completing the circuit from the positive terminal of the alternator to the output terminal to provide current flow therethrough from the battery, and a biasing circuit portion coupled to said transistor and including a switch connected to the negative terminal to bias said transistor from the battery potential to render the same conducting.

3. A circuit for providing field current to an alternator-regulator system connected to a battery having the positive side grounded and including an alternator-rectifier unit having a positive terminal and a negative terminal connected to the battery, with a field winding connected between the negative terminal and an input terminal and a rectifier connected between the positive terminal and a grounded output terminal, and wherein a regulator controls the flow of field current from the positive terminal to the input terminal in accordance with the voltage between the positive and negative terminals, said circuit including a transistor having output electrodes and a control electrode, a series circuit for connecting the grounded output terminal of the alternator-rectifier unit to the positive terminal to thereby bridge the rectifier, said series circuit including said output electrodes of said transistor, a diode and resistor means, said diode being poled to prevent current flow from the positive terminal of the alternator to the grounded output terminal, and biasing means coupled to said control electrode of said transistor including switch means connected to the negative terminal of the alternator-rectifier unit to bias said transistor to render the same conducting to complete the circuit for current flow from the battery from the grounded output terminal to the positive terminal and through the regulator to the field winding.

4. A circuit for providing field current to an alternator of an electrical system having a battery with the positive side grounded and a switch connected to the negative side thereof, an alternator-rectifier unit having a positive terminal and a negative terminal connected to the battery, with a field winding connected between the negative terminal and an input terminal, and a rectifier connected between the positive terminal and a grounded output terminal, and wherein a regulator controls the flow of field current from the positive terminal to the input terminal in accordance with the voltage between the positive and negative terminals; said circuit including a transistor having output electrodes and a control electrode, a series circuit for connecting the grounded output terminal of the alternator-rectifier unit to the positive terminal to thereby bridge the rectifier, said series circuit including said output electrodes of said transistor, a diode and a resistor means, said diode being poled to prevent current flow from the positive terminal of the alternator to the grounded output terminal, and biasing means coupled to said control electrode of said transistor and to the switch connected to the negative side of the battery to apply the battery potential to bias said transistor to render the same conducting, whereby said transistor completes the circuit from the ouput terminal to the positive terminal and through the regulator to the field winding for flow of initial field excitation current from the battery to the field winding.

5. A circuit for providing field current to an alternator of an electrical system having a battery with the positive side grounded and a switch connected to the negative side thereof, an alternator-rectifier unit having a positive terminal and a negative terminal connected to the battery, with a field winding connected between the negative terminal and an input terminal, and a rectifier connected between the positive terminal and a grounded output terminal, and wherein a regulator controls the flow of field current from the positive terminal to the input terminal in accordance with the voltage between the positive and negative terminals; said circuit including a transistor having output electrodes and a control electrode, a series circuit for connecting the grounded output terminal of the alternator-rectifier unit to the positive terminal to thereby bridge the rectifier, said series circuit including said output electrodes of said transistor, a diode and indicator means, said diode being poled to prevent current flow from the positive terminal of the alternator to the grounded output terminal, and biasing means coupled to said control electrode of said transistor and to the switch connected to the negative side of the battery to apply the battery potential to bias said transistor to render the same conducting, whereby said transistor completes the circuit from the ouput terminal to the positive terminal and through the regulator to the field winding for flow of initial field excitation current from the battery to the field winding, said indicator means indicating current flow from the battery to the field winding.

6. A circuit for providing field current to an alternator of an electrical system having a battery with the positive side grounded and a switch connected to the negative side thereof, an alternator-rectifier unit having a positive terminal and a negative terminal connected to the battery, with a field winding connected between the negative terminal and an input terminal, and a rectifier connected between the positive terminal and a grounded output terminal, and wherein a regulator controls the flow of field current from the positive terminal to the input terminal in accordance with the voltage between the positive and negative terminals; said circuit including switch means having a circuit closing portion and a control portion, a series circuit portion for connecting the grounded output terminal of the alternator-rectifier unit to the positive terminal thereof to thereby bridge the diode, said series circuit including said circuit closing portion of said switch means, a diode and resistor means, said diode being poled to prevent current flow from the positive terminal of the alternator to the grounded output terminal, and control means coupled to said control portion of said switch means and to the switch connected to the negative side of the battery to apply the battery potential to said control portion so that said circuit closing portion completes the circuit from the output terminal to the positive terminal and through the regulator to the field winding for flow of initial field excitation current from the battery to the field winding.

References Cited

UNITED STATES PATENTS

| | | | |
|---|---|---|---|
| 2,975,352 | 3/1961 | Ford | 320—48 X |
| 3,138,751 | 6/1964 | Brewster | 322—73 X |
| 3,152,298 | 10/1964 | Byles | 322—73 |
| 3,202,901 | 8/1965 | Peras | 322—79 X |

MILTON O. HIRSHFIELD, *Primary Examiner.*

J. J. CWARTZ, J. D. TRAMMELL,
*Assistant Examiners.*